(12) United States Patent
Curtin (10) Patent No.: US 9,065,244 B1
(45) Date of Patent: Jun. 23, 2015

(54) COMPACT MODULAR FREE ELECTRON LASER (FEL) ARCHITECTURE

(71) Applicant: The Boeing Company, Chicago, IL (US)

(72) Inventor: Mark S. Curtin, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/267,337

(22) Filed: May 1, 2014

(51) Int. Cl.
*H01S 3/00* (2006.01)
*H01S 3/09* (2006.01)

(52) U.S. Cl.
CPC .................. *H01S 3/0903* (2013.01)

(58) Field of Classification Search
USPC .............................................. 372/2
See application file for complete search history.

(56) References Cited

U.S. PATENT DOCUMENTS

| | | | |
|---|---|---|---|
| 4,323,857 A | 4/1982 | Brau et al. | |
| 6,636,534 B2 | 10/2003 | Madey et al. | |
| 6,858,998 B1 * | 2/2005 | Shenoy et al. | 315/503 |
| 8,093,840 B1 | 1/2012 | Douglas | |
| 2005/0175042 A1 * | 8/2005 | Hajima | 372/2 |
| 2013/0083880 A1 | 4/2013 | Noonan et al. | |

FOREIGN PATENT DOCUMENTS

WO WO 97/44804 11/1997

OTHER PUBLICATIONS

Wang, Chun, xi, Noonan, John, Lewellen, John W., "Dual-Axis Energy-Recovery Linac", Proceedings of ER107, Daresbury, UK, Argonne National Laboratory, Argonne, IL, pp. 122-125, 2007.
Hajima, R., "Overview of Energy-Recovery Linacs", JAEA-ERL, Tokai, Ibaraki 319-1195, Japan, 2007.
Merminga, Lia, "Energy Recovery Linacs", Jefferson Laboratory, Newport News, VA, Proceedings of PAC07, Albuquerque, New Mexico, USA, pp. 22-26, Sep. 2007.

* cited by examiner

*Primary Examiner* — Kinam Park (57) ABSTRACT

A high average power free electron laser (HAPFEL) architecture supporting multiple gain generator configurations with multiple synchronized output beams. The HAPFEL generates straight-line counter-propagating electron beams. Multiple RF electron guns and Superconducting Dual-axis Energy Recovery Linacs (SDERLs) define a fixed physical configuration for generating the counter-propagating electron beams and for recovering electron beam energy. A gain generator may be reconfigured into different configurations without physically reconfiguring the hardware supporting the counter-propagating electron beams.

20 Claims, 6 Drawing Sheets

COMPACT MODULAR FREE ELECTRON LASER (FEL) ARCHITECTURE

TECHNICAL FIELD

The field of the embodiments presented herein is directed toward modular free electron laser architectures to produce multiple synchronous high power laser beams, and more particularly, to providing numerous gain configurations from fixed geometry electron beams with improved optical extraction efficiency leading to high average power FEL systems.

BACKGROUND

A free electron laser (FEL) provides powerful beams of laser light at low cost at continuously tunable frequencies by generating coherent optical radiation from a stream of relativistic electrons that move freely through a magnetic wiggler structure. FEL applications include industrial laser applications as well as military applications. For example, a FEL may be deployed in space or on a ship to defend against incoming missiles and rockets. Communications and power transmissions are other examples of uses for FELs.

One configuration of a FEL is at the Thomas Jefferson National Accelerator Facility, commonly referred to as Jefferson Lab or JLab, in Newport News, Va. The JLab FEL is based on a ring-architecture employing a single-axis Energy Recovery Linac (ERL). An radio frequency (RF) electron gun produces electrons and introduces them into multiple stages of superconducting RF linear accelerators (linacs) that produce electric fields which accelerate the electrons. The ring-based architecture also includes magnets that bend the electron trajectories enabling transport of the electron beam to the FEL gain generator and back to the entrance of the accelerator structures for energy recovery. The FEL can be configured as an oscillator consisting of a wiggler magnet structure and a resonator allowing photons to bounce back and forth to become a coherent laser. In other words, the FEL extracts energy from the electron beam and turns it into photon energy. Recirculation arcs may form part of the ring architecture to bend the electron beam through 360 degrees in order to inject the exhaust electron beam back through the same linac structure used to accelerate the pristine electron beam. The JLab FEL has demonstrated sustained operation at≈15 kW. However, progressing to high average power FELs requiring ampere-class electron beams significantly exacerbates the physics and engineering challenges that accompany such high current, high brightness electron beams for ring-based architectures.

Progression with high average power FELs has been slow due to technology challenges associated with management of the high average power electron and optical beams. The process of bending the electron beam degrades the electron beam phase space distribution which affects the gain out of the FEL and the ability to recover energy from the exhaust electron beam. If bending of the trajectory of the electron beam can be avoided, improved optical extraction efficiency can be achieved in addition to improved energy recovery.

Ring-based FEL architectures suffer efficiency impacts associated with the need to simultaneously accelerate a pristine beam and recover energy from an exhaust beam in a single-axis ERL structure principally due to challenges in exhaust beam transport and merge assemblies. FEL architectures that employ a single-axis ERL structure for both the acceleration of a pristine electron beam and energy recovery from an exhaust electron beam require the ERL structure to accommodate twice the average beam current seen by the FEL gain generator which limits total efficiency of the FEL device. Incorporating multiple photo-injectors into ring-based FEL architecture to overcome the required charge generation challenges for high average current devices is limited by the average current capacity of the single-axis accelerator structure.

It is with respect to these and other considerations that the disclosure herein is presented. All of the aforementioned features and performance impacts are mitigated in the proposed FEL system architecture.

SUMMARY

It should be appreciated that this Summary is provided to introduce a selection of concepts in a simplified form that are further described below in the Detailed Description. This Summary is not intended to be used to limit the scope of the claimed subject matter.

According to one embodiment disclosed herein, a high average power free electron laser (HAPFEL) is provided. The HAPFEL includes a pair of oppositely disposed RF electron guns configured to generate spatially-separated, counter-propagating electron beams. The HAPFEL also includes a pair of energy recovery linacs (ERLs) configured to accelerate a pristine electron beam and decelerate the counter-propagating exhaust electron beam effectively recovering the exhaust electron beam energy and transferring the energy to the pristine electron beam. The RF electron guns and the ERLs define a fixed physical configuration for generating the counter-propagating electron beams and for recovering electron beam energy. The HAPFEL also includes a gain generator configured to utilize available energy from the pair of the counter-propagating electron beams to generate a laser beam. The gain generator is reconfigurable without physically reconfiguring hardware supporting the counter-propagating electron beams.

According to another embodiment disclosed herein, a HAPFEL is provided having a pair of oppositely disposed RF electron guns configured to generate counter-propagating electron beams. A pair of ERLs are configured to accelerate the counter-propagating electron beams and to recover electron beam energy. The RF electron guns and the ERLs define a fixed physical configuration for generating and transporting the counter-propagating electron beams and for recovering electron beam energy. The HAPFEL also includes a gain generator configured to utilize available energy from both of the counter-propagating electron beams to generate a single or multiple laser beams. The gain generator is reconfigurable into a seeded or nonseeded two-gain-stage oscillator configuration employing multiple wigglers, a seeded amplifier-seeded amplifier (SASA) configuration, or a master-oscillator-power amplifier (MOPA) configuration, without physically reconfiguring hardware supporting the counter-propagating electron beams.

According to yet another embodiment disclosed herein, a method of reconfiguring a HAPFEL is provided. The method includes generating two straight-line counter propagating electron beams. Electron beam propagating along the a-axis from left to right comprises a pristine electron beam upstream of the gain generator and an exhaust electron beam downstream of the gain generator. Similarly the electron beam propagating along the b-axis from right to left comprises a pristine electron beam upstream of the gain generator and an exhaust electron beam downstream of the gain generator. The method also includes accelerating the pristine electron beams and recovering energy from the exhaust electron beams. The method also includes generating a single or multiple laser beams with a gain generator and reconfiguring the gain generator without physically reconfiguring hardware supporting the counter-propagating electron beams.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein.

The plurality of figures presented in this application illustrates variations and different aspects of the embodiments of the present disclosure. Accordingly, the detailed description on each illustration will describe the differences identified in the corresponding illustration.

DETAILED DESCRIPTION

The following detailed description is directed to straight-line free electron lasers (FELs) with counter-propagating electron beams to power multiple gain generator configurations supporting multiple output laser beams. The present invention is susceptible of embodiment in many different forms. Specifically, these gain generator configurations include, for example, multiple wiggler configurations including a two-gain-stage FEL employing a ring resonator configuration, a seeded amplifier-seeded amplifier (SASA) configuration, an oscillator-oscillator configuration, and a master-oscillator-power amplifier (MOPA) configuration. Other gain generator configurations are contemplated. The proposed FEL system architecture provides access to all of the aforementioned gain generator configurations without the need for physical reconfiguration of the electron beam architecture. There is no intent to limit the principles of the present invention to the particular disclosed embodiments. In the following detailed description, references are made to the accompanying drawings that form a part hereof and in which are shown by way of illustration specific embodiments or examples. Referring now to the drawings, in which like numerals represent like elements throughout the several figures, aspects of the present disclosure will be presented.

High performance, high efficiency FELs demand high brightness, high current electron beams and the ability to recover exhaust electron beam energy prior to stopping the beam in a beam dump. Standard FEL ring-based architectures employ single-axis ERL technologies that require bending of the electron beam through a minimum of 360 degrees and merging the high energy exhaust electron beam with the low energy pristine electron beam onto the axis of the ERL. The function of a standard single-axis ERL structure, such as the ring architecture of the JLab FEL, is to both accelerate a pristine electron beam and de-accelerate an exhaust electron beam through the efficient transfer of exhaust beam energy to pristine beam energy. Bending a high brightness, high current electron beam both degrades efficiency through copious generation of Synchrotron Radiation (SR) and Coherent Synchrotron Radiation (CSR) and destroys beam brightness due to CSR-induced phase space dilution and distortion. Further FEL performance degradation results from merge-design compromises necessary to achieve co-propagation along a common ERL axis for pristine and exhaust beams with such dissimilar energies.

Figure 1:
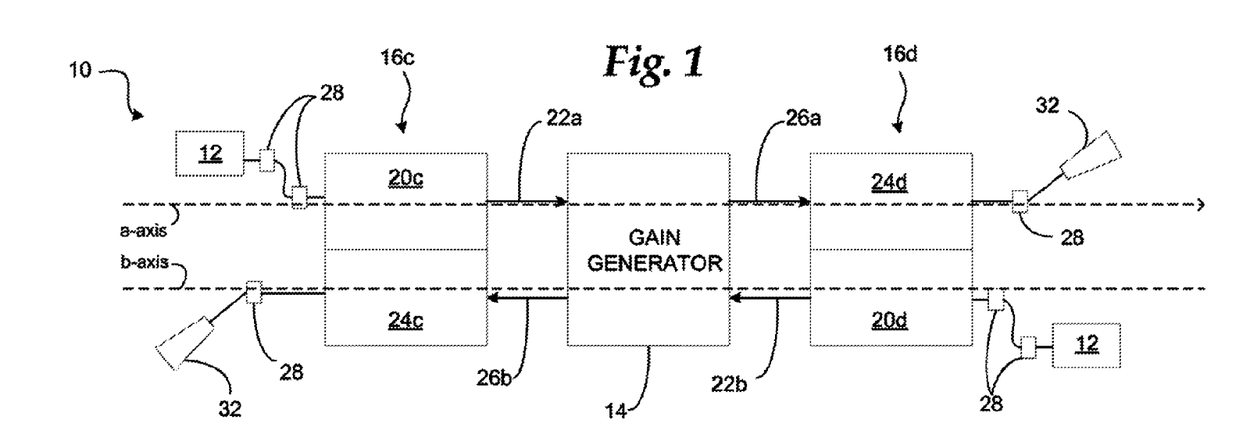
FIG. 1 illustrates straight-line free electron laser (FEL) architecture having counter propagating electron beams with a generalized gain generator according to at least one embodiment disclosed herein.

As shown in FIG. 1, a straight-line FEL architecture with counter-propagating electron beams (nonoverlapping electron beams propagating in opposite directions) mitigates at least some of the limitations associated with the co-propagation of the pristine and the exhaust electron beams of the ring-based FEL architectures employing single-axis ERL structures by minimizing electron-beam bending. In other words, the straight-line FEL architecture minimizes electron-beam bending eliminating the need for recirculation arcs as in the JLab ring-based architecture.

This straight-line FEL architecture is referred to as a high average power free electron laser (HAPFEL) 10. A FEL requires a source of energy such as an electron beam and also a means to covert the source of energy into a laser. HAPFEL 10 utilizes multiple RF electron guns 12 to generate the two counter-propagating electron beams, multiple ERLs to both accelerate and decelerate the electron beams matched to a gain generator 14. The RF electron guns 12, generate pulsed electron beams with beam energy of about 1 to 5 MeV for example, which are guided into superconducting dual-axis energy recovery linacs (ERLs) 16c, 16d, (hereinafter may be referred to collectively and/or generically as "ERL 16" or "ERLs 16"), capable of transferring energy between co-aligned accelerating and decelerating axes such as the superconducting dual-axis energy recovery linac (SDERL) disclosed by Chun-xi Wang, John Noonan and John W. Lewellen of Argonne National Laboratory, Argonne, Ill. USA, DUAL-AXIS ENERGY RECOVERY LINAC, Proceedings of ERL07, Daresbury, United Kingdom, pp. 122-125 (2007), which is herein incorporated by reference in its entirety.

Reference numbers followed by the letters "a" and "b" correspond with the a-axis and b-axis, respectively, that represent the directional path of the photon or electron beams.

Reference numbers followed by the letters "c" and "d" correspond with the hardware of the ERLs 16c, 16d. Each superconducting dual axis ERL 16c, 16d has an acceleration axis where the pristine electron beam is accelerated and a spatially separated deceleration axis where energy is drawn out of the counter-propagating exhaust electron beam. Electron beam propagating along the a-axis from left to right comprises a pristine electron beam (22a) upstream of the gain generator and an exhaust electron beam (26a) downstream of the gain generator. Similarly the electron beam propagating along the b-axis from right to left comprises a pristine electron beam (22b) upstream of the gain generator and an exhaust electron beam (26b) downstream of the gain generator.

The pair of ERLs utilized in the straight-line FEL configuration are co-aligned such that the acceleration axis of ERL 16c and the deceleration axis of ERL 16d lie along the a-axis and likewise the acceleration axis of ERL 16d and the deceleration axis of ERL 16c lie along the b-axis. Each ERL 16c, 16d are composed of cavities with apertures co-aligned along a common axis. For example, the apertures of a first collection of cavities correspond or are co-aligned with the acceleration axis and the apertures of a second collection of cavities correspond or are co-aligned with the deceleration axis. Each collection of cavities may be referred to as a cavity structure.

Because multiple RF electron guns 12 are employed in the HAPFEL 10, the pair of ERLs 16 of HAPFEL 10 need only support half of the electron beam current per axis as compared to the single-axis ERL employed in the JLab ring-based architecture. The single-axis ERL used in the ring-based architecture at JLabs delivers effectively only half the average current to the gain generator as transported through the ERL structure. In other words, achievable FEL optical output power from a single-axis linac configuration with same-cell energy recovery such as employed in the JLAB FEL is limited by the electron beam throughput of the single-axis ERL.

Each dual axis ERL 16c, 16d includes a first cavity structure 20c, 20d to accelerate a high-quality pristine electron beam 22a, 22b to about 100 MeV, for example, and a second cavity structure 24c, 24d on the deceleration axis for decelerating the counter-propagating exhaust electron beam 26b, 26a to recover the beam energy and supply a sustained cavity gradient in the acceleration axis cavity structure within the same ERL device. In other words, the ERL 16c cavity structure 20c puts energy into the electron beam 22a and the second cavity structure 24c takes energy out of the electron beam 26b. The energy imparted to the pristine electron beam 22a by the first cavity structure 20c is partially recouped from the exhaust electron beam 26b energy recovery occurring in the second cavity structure 24c. Cavity structures 20c, 20d and cavity structures 24c, 24d may hereinafter referred to collectively and/or generically as "cavity structures 20 and cavity structures 24, respectively.

From each second cavity structure 24 the spent electron beam is deflected from its propagation axis by a bending magnet 28, to bend the electron beam out of the way of the optics, and stopped at a beam dump 32. Bending magnets 28 may also be used with the electron guns 12 to deliver the electron beams to the first cavity structures 20 along a particular axis. In one or more configurations, the first cavity structure 20 and the second cavity structure 24 may have different aperture sizes. Increased aperture size for cavity structure 24 may prove beneficial for higher throughput of the exhaust electron beams 26a, 26b to their respective beam dumps 32.

The HAPFEL 10 employing multiple RF electron guns places less burden on each RF gun in meeting the total system beam-current requirement effectively limiting the necessary photocathode current density and providing a more robust power-scaling path when compared to single RF electron gun architectures.

Proper utilization of the straight-line FEL architecture requires an FEL gain generator configuration designed to best exploit the counter-propagating electron beams. As explained above, the gain generator 14 may be configured many different ways without requiring physical reconfiguration of the hardware supporting the electron beam trajectories. All of the gain generator 14 variants are capable of extracting energy from each of the counter-propagating electron beams.

Specifically, these gain generator configurations include, for example, multiple wiggler configurations including a two-gain-stage FEL employing a ring resonator configuration, a SASA configuration, an oscillator-oscillator configuration, and a MOPA configuration. The gain generator 14 may have a first architecture or variant and then be reconfigured into a second variant or even a third or fourth variant without requiring alteration of the supporting electron beam hardware configuration. In other words, the physical position of the RF electron guns 12, the dual axis ERL 16, and the beam dumps 32 may remain the same in any gain generator 14 configuration. Furthermore the total electron beam current available to generate optical gain is partitioned into two separate and counter-propagating electron beams coupled with the straight-line architecture act to reduce non-linear beam effects allowing increased optical extraction and increased system-level wall-plug efficiency.

Figure 2:
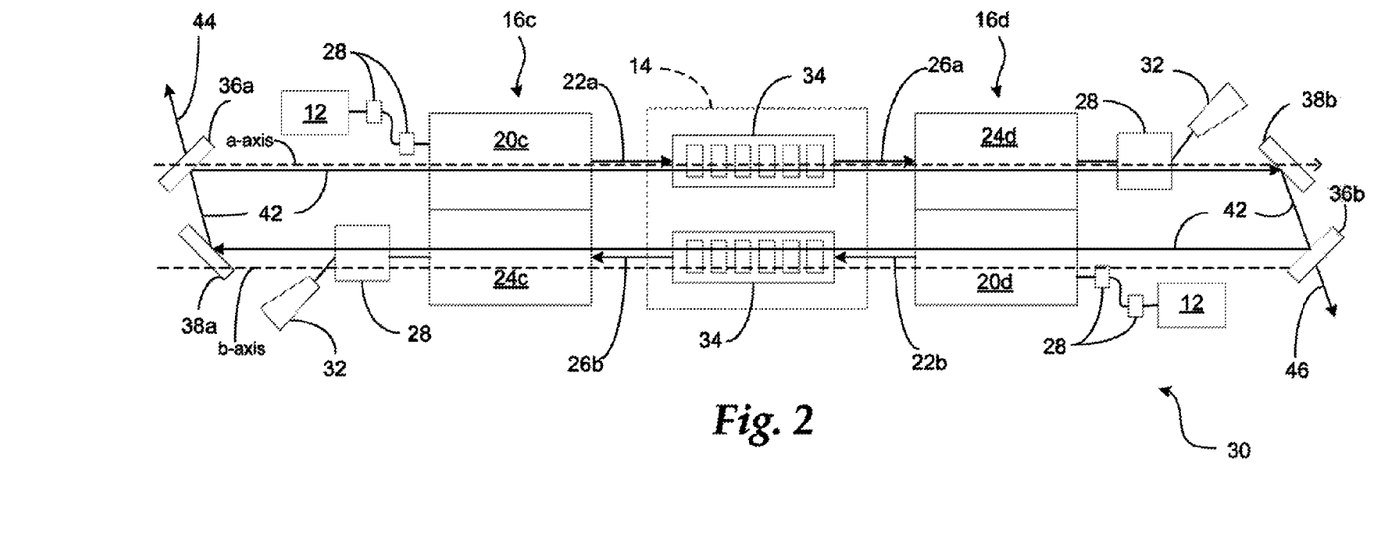
FIG. 2 illustrates the straight-line FEL architecture of FIG. 1 wherein the gain generator is a two-gain-stage oscillator employing two wigglers according to at least one embodiment disclosed herein.

FIG. 2 illustrates a HAPFEL 30 which is based on the straight-line configuration of FIG. 1 including the ERLs 16. But the gain generator 14 includes, in particular, a two-gain-stage oscillator configuration employing two wigglers 34 and that, with the use of out-coupling mirrors 36a, 36b and grazing optics 38a, 38b (laser beam is hitting at a grazing angle to increase footprint), provides a grazing incidence ring resonator. The physical configuration of the counter propagating electron beams remain unchanged compared to FIG. 1, but the HAPFEL 30 includes additional optics to provide the ring resonator through the use of out-coupling mirrors 36a, 36b and grazing optics 38a, 38b so that an optical beam 42 can travel around the ring resonator and reach saturation. Because HAPFEL 30 utilizes an oscillator configuration, the intracavity optical beam 42 travels multiple times around the ring resonator. HAPFEL 30 includes two optical output beams 44, 46.

Figure 3:
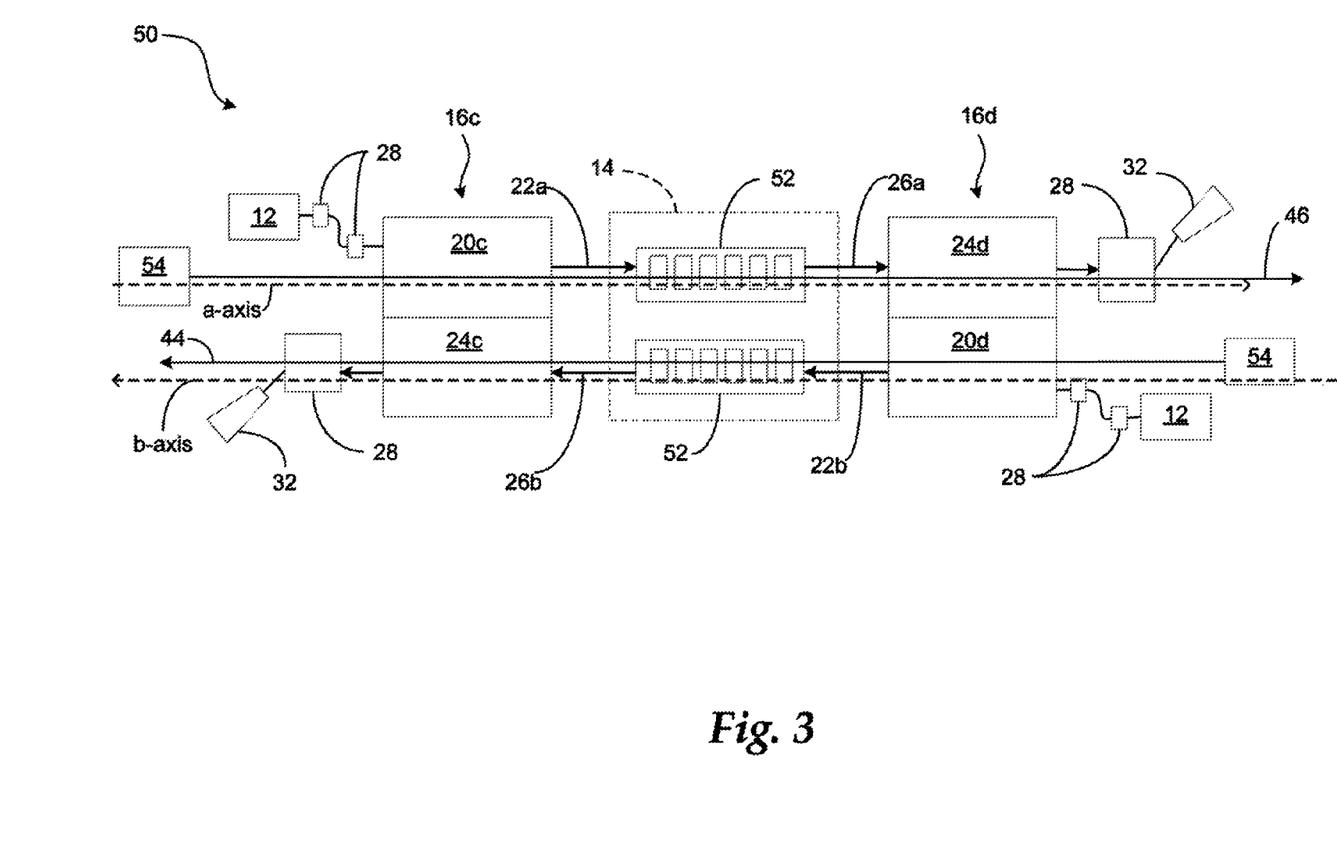
FIG. 3 illustrates the straight-line FEL architecture of FIG. 1 wherein the gain generator is a pair of seeded amplifiers with two oppositely propagated optical output beams according to at least one embodiment disclosed herein.

FIG. 3 illustrates a HAPFEL 50 that is also based on the straight-line configuration of FIG. 1 including the ERLs 16. But the gain generator architecture includes, in particular, a pair of seeded amplifier wigglers 52 and two amplifier seed lasers (ASLs) 54 with two oppositely propagated optical output beams 44, 46. The HAPFEL 30 of FIG. 2 is distinguishable from the HAPFEL 50 of FIG. 3 primarily because the HAPFEL 30 utilizes an oscillator configuration and the HAPFEL 50 utilizes an amplifier configuration. Otherwise, with only a reconfigurable optical system and the addition of the ASLs 54, an alternate FEL gain generator configuration can be achieved while maintaining the physical configuration of the two counter-propagating electron beams.

Figure 4:
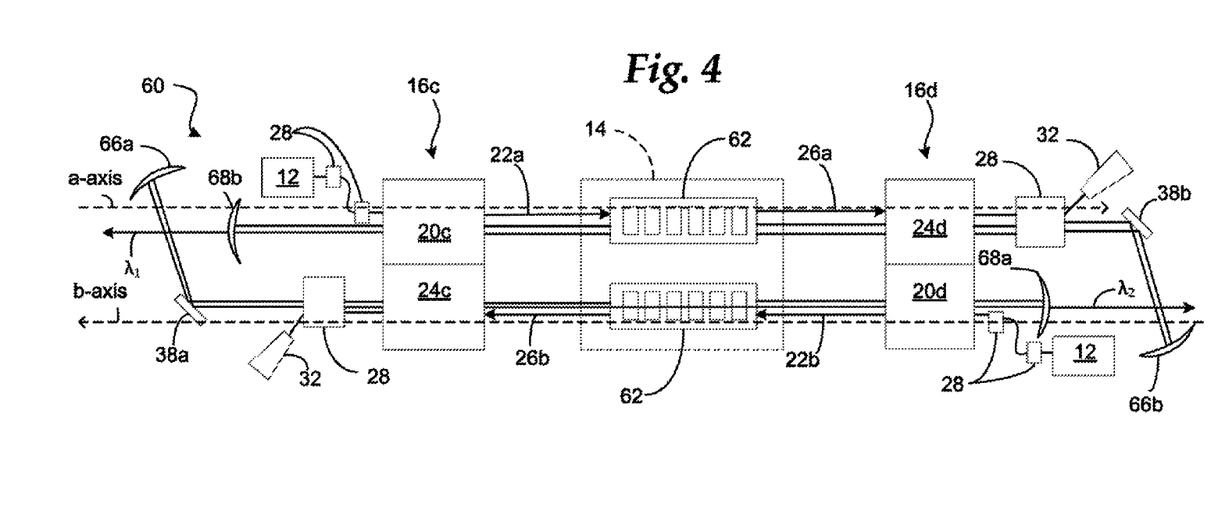
FIG. 4 illustrates the straight-line FEL architecture of FIG. 1 wherein the gain generator is a two oscillator-wiggler configuration allowing spectral scanning of multiple optical output laser beams for pump probe capability according to at least one embodiment disclosed herein.

FIG. 4 illustrates a HAPFEL 60 that is also based on the straight-line configuration of FIG. 1 including the ERLs 16. But the gain generator architecture includes, in particular, a pair of oscillator wigglers 62 with two opposite and parallel optical laser beam outputs of wavelengths $\lambda_1$, $\lambda_2$ enabling time-resolved pump-probe spectroscopy. HAPFEL 60 is similar to HAPFEL 30 except that HAPFEL 60 has two separate resonators operating with the wigglers 62 to provide the two optical output laser beams. Also included are outcoupler optics 68a and 68b which outcouple a fraction of the light circulating within the resonators. The HAPFEL 60 individual resonators also include high reflectance mirrors 66a and 66b along with grazing optics 38a, 38b.

Figure 5:
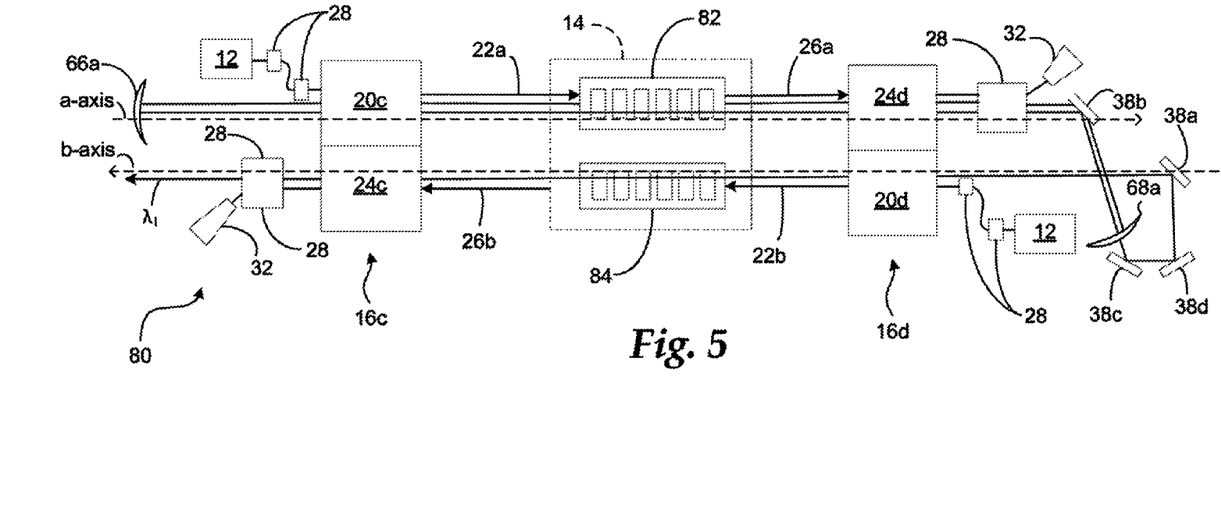
FIG. 5 illustrates the straight-line FEL architecture of FIG. 1 wherein the gain generator is a master oscillator power amplifier (MOPA) configuration enabling spectral scanning of high average power optical output according to at least one embodiment disclosed herein.

FIG. 5 illustrates a HAPFEL 80 that is also based on the straight-line configuration of FIG. 1 including the ERLs 16. But the gain generator architecture includes, in particular, the combination of an amplifier wiggler 84 and an oscillator wiggler 82 defining what is commonly referred to as a master oscillator power amplifier (MOPA) configuration. The HAPFEL 80 includes a MO resonator where the output from the resonator performs a single-pass through the amplifier wiggler. In order to reconfigure the optic system for a single optical output laser beam of wavelength $\lambda_1$, the HAPFEL 80 includes additional optics 38a, 38c and 38d.

Figure 6:
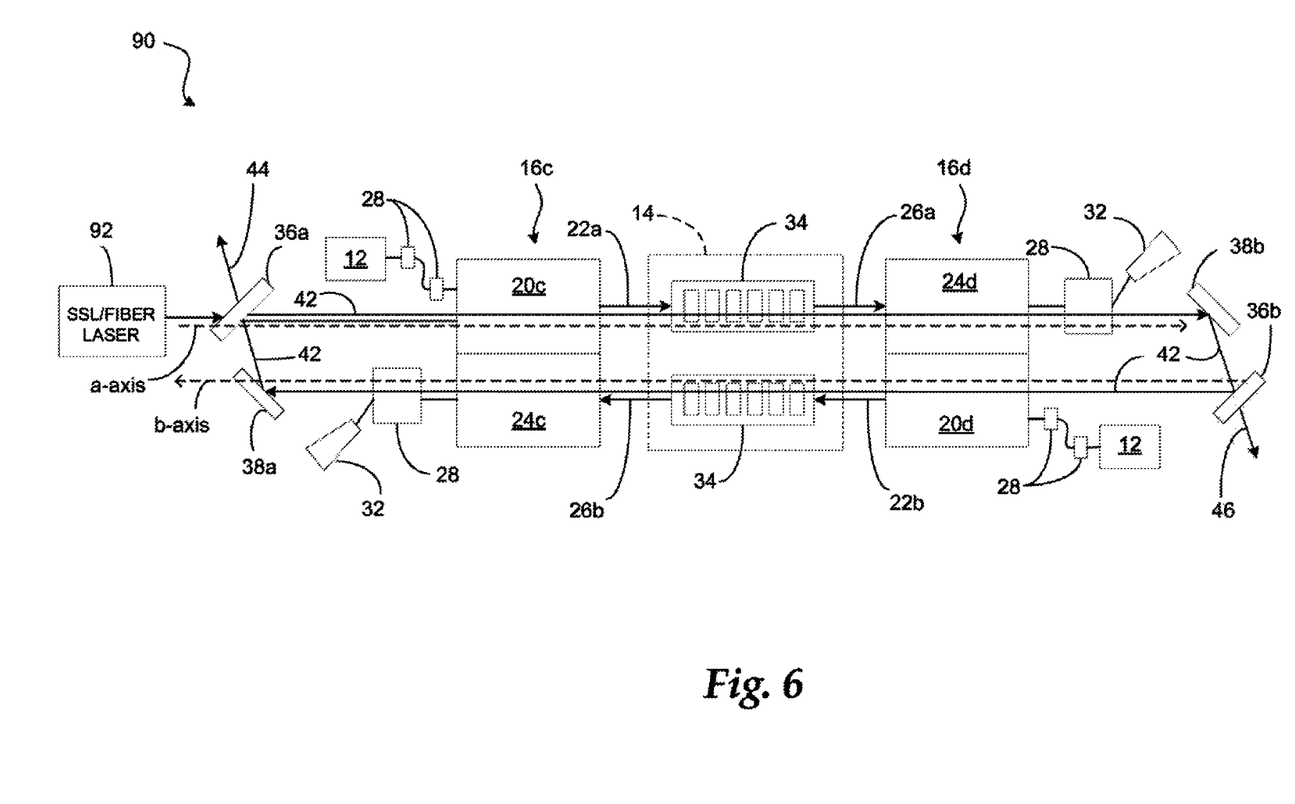
FIG. 6 illustrates a seeded dual gain stage oscillator straight-line FEL architecture with a solid state laser (SSL)/fiber laser and wherein the gain generator is a two-gain-stage oscillator employing two wigglers according to at least one embodiment disclosed herein.

FIG. 6 illustrates a straight-line architecture of a HAPFEL 90 that is similar to the architecture of FIG. 2 but also includes a Solid State or Fiber (SSL/fiber) laser 92 to seed the FEL oscillator.

In one or more configurations of the HAPFELs 30, 50, 60, 80, 90 two or more gain generators 14 may be coupled in series or ganged together in a parallel architecture for scaling to even higher average power through spectral beam combining, coherent beam combining and hybrid beam combining techniques.

Figure 7:
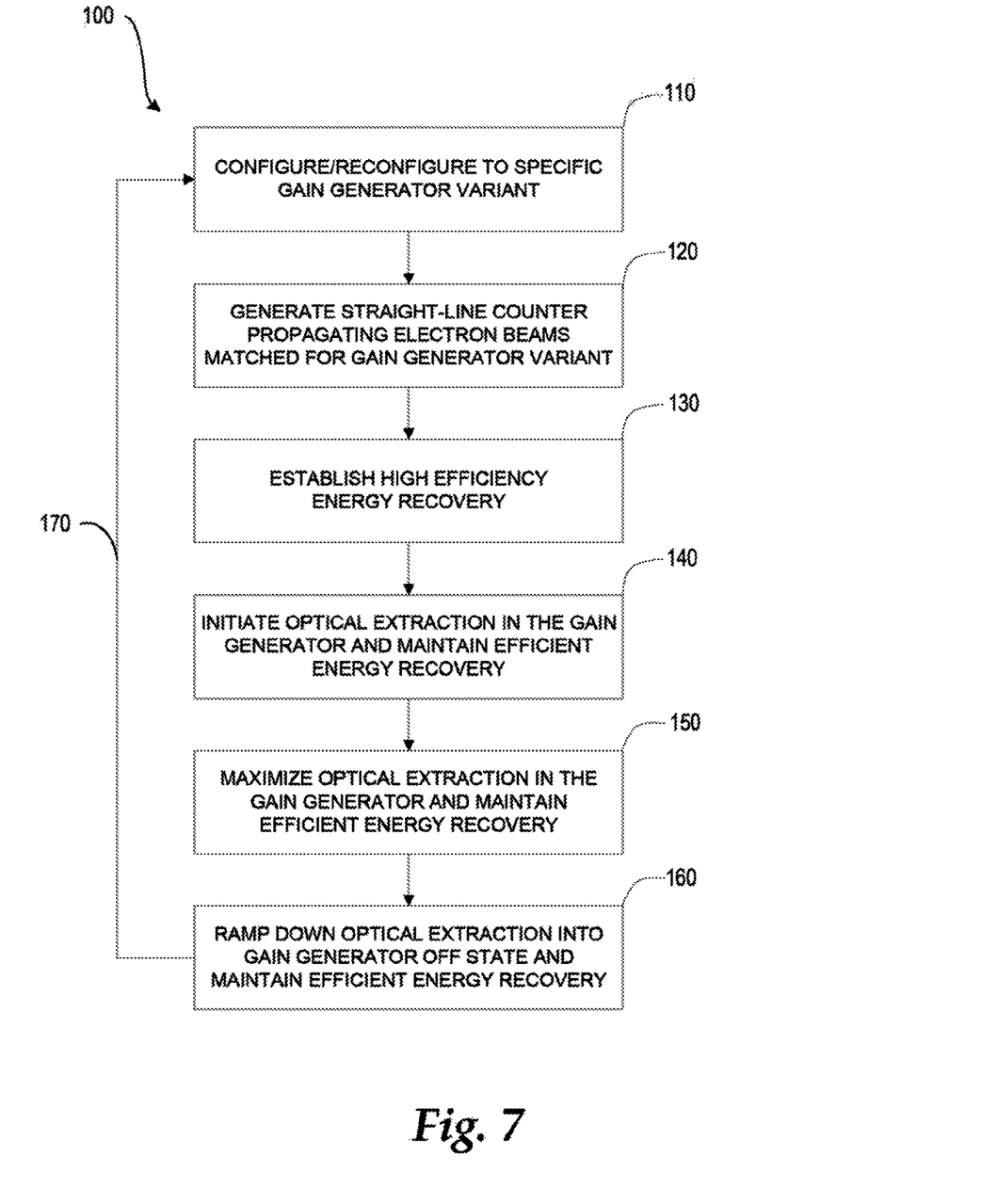
FIG. 7 illustrates one configuration of a method for configuring one variant of a gain generator and then reconfiguring that one variant into another variant of a gain generator according to at least one embodiment disclosed herein.

FIG. 7 illustrates method 100 for reconfiguring one HAPFEL such as one of the HAPFELs 30, 50, 60, 80, 90 to another HAPFEL with a different gain generator configuration such as another one of the HAPFELs 30, 50, 60, 80, 90. Unless otherwise indicated, more or fewer operations may be performed than shown in the figures and described herein. Additionally, unless otherwise indicated, these operations may also be performed in a different order than those described herein.

The method 100 starts at operation 110 where a HAPFEL is configured to include a specific variant of a gain generator. At operation 120 a pair of straight-line counter-propagating pristine electron beams are generated by energizing the RF electron guns. Operation 130 includes establishing high-efficiently energy recovery initially without the gain generator being on to ensure electron beam synchronization and alignment. The method 100 continues to operation 140 for initiating optical extraction (effectively turning on the gain generator) while maintaining efficient energy recovery. Operation 150 then includes maximizing optical extraction in the gain generator while continuing to maintain efficient energy recovery. At operation 160 the method 100 includes ramping down optical extraction of the gain generator, effectively turning off the gain generator. From operation 160, method 100 continues along loop 170 back to operation 110 where the HAPFEL is reconfigured into another HAPFEL having a different variant of a gain generator with different optics.

Figure 8:
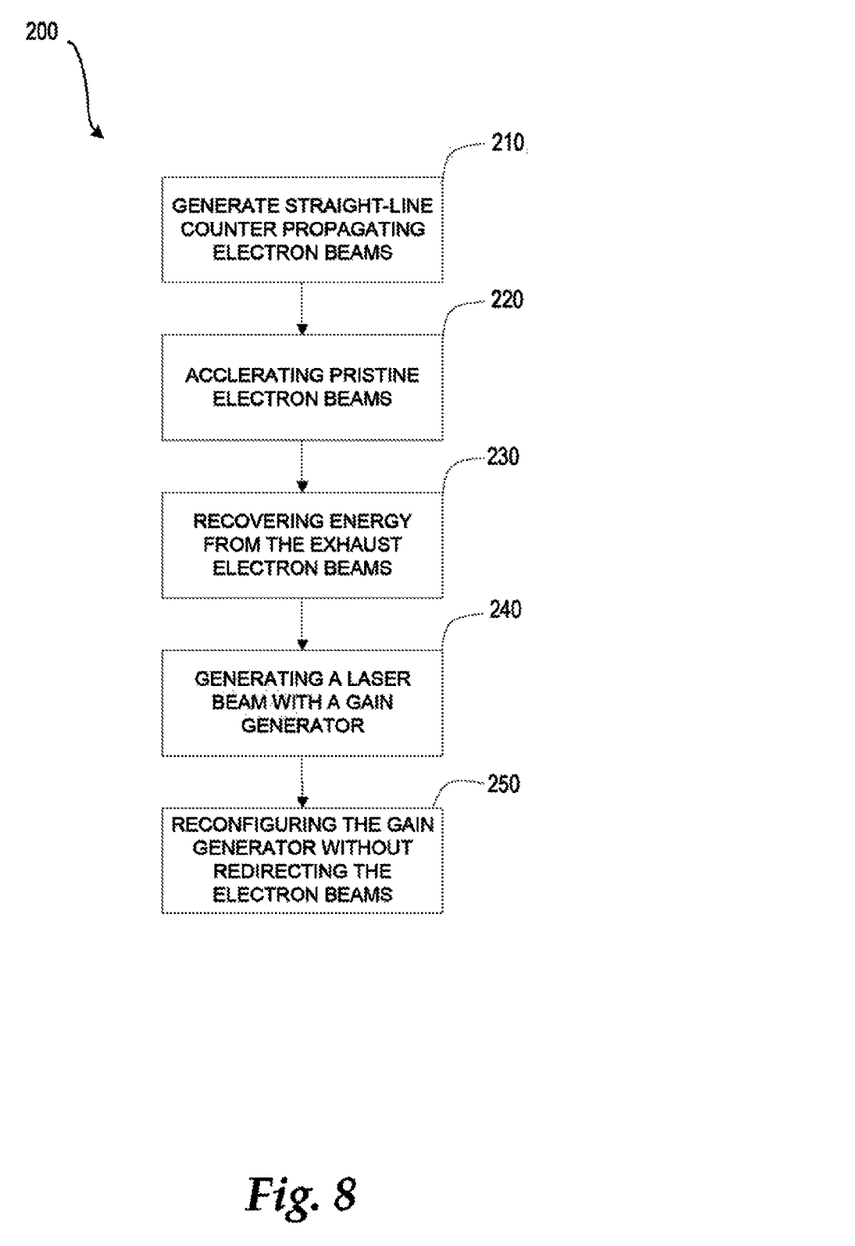
FIG. 8 illustrates one configuration of a method for reconfiguring a high average power free electron laser (HAPFEL) according to at least one embodiment disclosed herein.

FIG. 8 illustrates another method 200 for reconfiguring a HAPFEL such as one of the HAPFELs 30, 50, 60, 80, 90 to another HAPFEL with a different gain generator configuration such as another one of the HAPFELs 30, 50, 60, 80, 90. Unless otherwise indicated, more or fewer operations may be performed than shown in the figures and described herein. Additionally, unless otherwise indicated, these operations may also be performed in a different order than those described herein The method 200 starts at operation 210, where two straight-line counter propagating electron beams are generated. Each straight-line counter propagating electron beam comprises a pristine electron beam and an exhaust electron beam. Operation 220 includes accelerating the pristine electron beams and operation 230 then includes recovering energy from the exhaust electron beams. In operation 240, a laser beam is generated with the gain generator. It is noted that although presented in succession, operations 220, 230 and 240 may substantially occur in parallel such that energy from the exhaust beam is recovered while providing gain for lasing. Operation 250 includes reconfiguring the gain generator without redirecting the trajectory of the two straight-line counter propagating electron beams.

The operation 250 of reconfiguring the gain generator may include changing from a two-gain-stage oscillator configuration employing multiple wigglers, a SASA configuration, or MOPA configuration, to another one of the two-gain-stage oscillator configuration employing multiple wigglers, the SASA configuration, or the MOPA configuration. For example, the operation 250 may include reconfiguring the gain generator from the two-gain-stage oscillator configuration employing multiple wigglers to the seeded amplifier-seeded amplifier SASA configuration, or vice versa. In another example, the operation 250 may include reconfiguring the gain generator from the SASA configuration to the MOPA configuration, or vice versa. In yet another example, the operation 250 may include reconfiguring the gain generator from the MOPA configuration to the two-gain-stage oscillator configuration employing multiple wigglers, or vice versa.

The method 200 may also include an operation where the gain generator is reconfigured again to either the two-gain-stage oscillator configuration employing multiple wigglers, the SASA configuration, or the MOPA configuration. In another embodiment, the operation 240 includes changing the gain generator from a single-stage gain generator to a multi-stage gain generator. The method 200 may also include redirecting at least one high average power optical output without redirecting the straight-line counter-propagating electron beams. In another embodiment, the method 100 could also include combining two or more of the HAPFELs 30, 50, 60, 80, 90 in series or ganged together in a ring-based or other architecture in order to scale to higher average power through spectral beam combining, coherent beam combining and hybrid beam combining techniques.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A high average power free electron laser (HAPFEL) comprising:
a pair of oppositely disposed RF electron guns configured to generate counter-propagating electron beams;
a pair of energy recovery linacs (ERLs), each ERL configured to accelerate a pristine electron beam and decelerate a counter-propagating exhaust electron beam effectively recovering exhaust electron beam energy and transferring the energy to the pristine electron beam, wherein the RF electron guns and the ERLs define a fixed physical configuration for generating the counter-propagating electron beams and recovering the exhaust electron beam energy; and
a gain generator configured to utilize available energy from both of the counter-propagating electron beams to generate a laser beam, wherein the gain generator is reconfigurable without physically reconfiguring hardware supporting the counter-propagating electron beams.

2. The HAPFEL of claim 1, wherein the gain generator is a multi-stage gain generator.

3. The HAPFEL of claim 1, wherein the gain generator is a two-gain-stage oscillator configuration employing multiple wigglers.

4. The HAPFEL of claim 1, wherein the gain generator is a seeded amplifier-seeded amplifier (SASA) configuration.

5. The HAPFEL of claim 1, wherein the gain generator is a master-oscillator-power amplifier (MOPA) configuration.

6. The HAPFEL of claim 1, wherein the counter-propagating electron beams are free of recirculation arcs.

7. The HAPFEL of claim 1, wherein the ERLs are superconducting dual-axis energy recovery linacs (SDERLs) and wherein the SDERLs includes a first cavity structure to accelerate a pristine electron beam and a second cavity structure for decelerating an exhaust electron beam to recover the beam energy.

8. The HAPFEL of claim 1 further comprising a reconfigurable optical system to redirect at least one high average power optical output.

9. A high average power free electron laser (HAPFEL) for, the HAPFEL comprising:
    a pair of oppositely disposed RF electron guns configured to generate counter-propagating electron beams;
    a pair of energy recovery linacs (ERLs) configured to accelerate one of the counter-propagating electron beams and to decelerate the other one of the counter-propagating electron beams to recover electron beam energy, wherein the RF electron guns and the ERLs define a fixed physical configuration for generating the counter-propagating electron beams and for recovering electron beam energy; and
    a gain generator configured to utilize available energy from the counter-propagating electron beams to generate one or more laser beams, wherein the gain generator is reconfigurable into a two-gain-stage oscillator configuration employing multiple wigglers, a seeded amplifier-seeded amplifier (SASA) configuration, or a master-oscillator-power amplifier (MOPA) configuration, without physically reconfiguring hardware supporting the counter-propagating electron beams.

10. The HAPFEL of claim 9, wherein the counter-propagating electron beams are free of recirculation arcs.

11. The HAPFEL of claim 9, wherein the ERLs are superconducting dual-axis energy recovery linacs (SDERLs) and wherein the SDERLs includes a first cavity structure to accelerate a pristine electron beam and a second cavity structure for decelerating a counter-propagating exhaust electron beam to recover the electron beam energy.

12. The HAPFEL of claim 9 further comprising a reconfigurable optical system to redirect at least one high average power optical output.

13. A method of reconfiguring a high average power free electron laser (HAPFEL), the method comprising:
    generating two straight-line counter-propagating electron beams, each straight-line counter-propagating electron beam comprising a pristine electron beam and an exhaust electron beam;
    accelerating the pristine electron beams;
    recovering energy from the exhaust electron beams;
    generating one or more laser beams with a gain generator; and
    reconfiguring the gain generator without physically reconfiguring hardware supporting the counter-propagating electron beams.

14. The method of claim 13 wherein said reconfiguring the gain generator comprises changing from one of a two-gain-stage oscillator configuration employing multiple wigglers, a seeded amplifier-seeded amplifier (SASA) configuration, and a master-oscillator-power amplifier (MOPA) configuration, to another one of the two-gain-stage oscillator configuration employing multiple wigglers, the SASA configuration, and the MOPA configuration.

15. The method of claim 14, wherein said reconfiguring the gain generator further comprises changing the other one of the two-gain-stage oscillator configuration employing multiple wigglers, the SASA configuration, and the MOPA configuration to yet another one of the two-gain-stage oscillator configuration employing multiple wigglers, the SASA configuration, and the MOPA configuration.

16. The method of claim 13, wherein said reconfiguring the gain generator comprises changing the gain generator from a two-gain-stage oscillator configuration employing multiple wigglers to a seeded amplifier-seeded amplifier (SASA) configuration.

17. The method of claim 13, wherein said reconfiguring the gain generator comprises changing the gain generator from a seeded amplifier-seeded amplifier (SASA) configuration to a master-oscillator-power amplifier (MOPA) configuration.

18. The method of claim 13, wherein said reconfiguring the gain generator comprises changing the gain generator from a master-oscillator-power amplifier (MOPA) configuration to a two-gain-stage oscillator configuration employing multiple wigglers.

19. The method of claim 13 further comprising redirecting at least one high average power optical output without redirecting the straight-line counter-propagating electron beams.

20. The method of claim 13 further comprising generating about half an average beam current per axis of the straight-line counter-propagating electron beams and accommodating approximately a same amount of average current at energy recovery linacs of the HAPFEL as transported through the gain generator.

* * * * *